Nov. 7, 1933.      F. H. EDSON      1,934,049
HYDROCARBON CRACKING PROCESS
Filed April 29, 1931
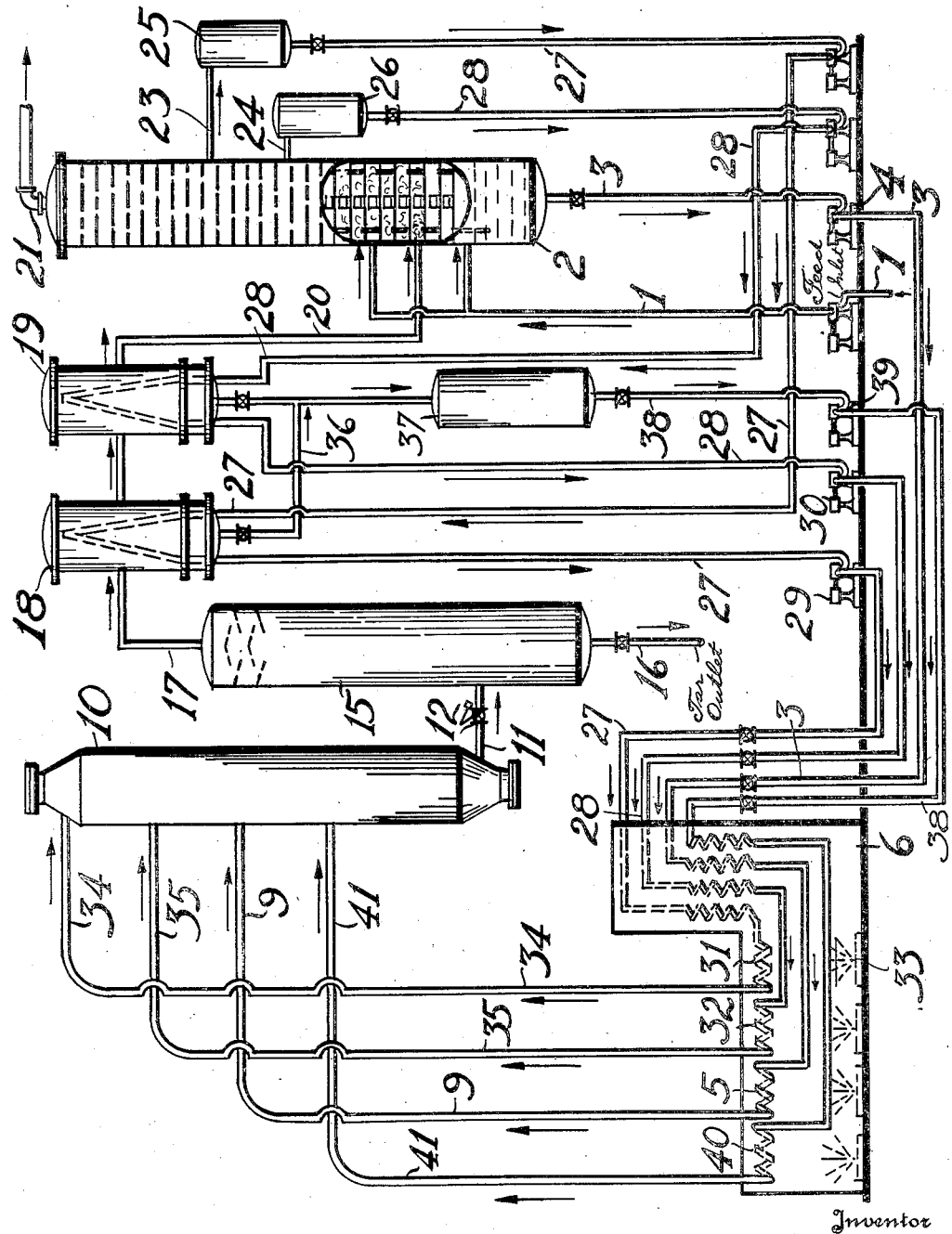
Inventor
Frank H. Edson
By
W. E. Currie, Attorney Patented Nov. 7, 1933

1,934,049

UNITED STATES PATENT OFFICE 1,934,049

HYDROCARBON CRACKING PROCESS

Frank H. Edson, Westfield, N. J., assignor to Standard Oil Development Company, a corporation of Delaware Application April 29, 1931. Serial No. 533,608

2 Claims. (Cl. 196—51)

This invention relates to improvements in the cracking of hydrocarbon oils.

The invention will be fully understood from the following description taken in connection with the accompanying drawing in which the figure is a diagrammatic side elevational view partly in vertical section illustrating an apparatus for carrying out the invention.

Referring particularly to the drawing, reference numeral 1 designates a charging stock line through which fresh feed oil is introduced into a lower or intermediate portion of a bubble tower 2. The fresh feed stock, such as gas oil, mingles with the vapors or bottoms in the bubble tower and is preheated thereby. The thus treated feed stock is withdrawn from the bottom of the bubble tower through a line 3 in which is disposed a pump 4. The pump forces the charging stock through the line 3 into heating coil 5 in the furnace 6 where the charging stock is heated preferably at the optimum temperatures and pressures to effect cracking of the oil. The heated oil is discharged through line 9 into an intermediate portion of a soaking drum 10. The inlet of the line 9 into the soaking drum 10 is so positioned with respect to discharge line 11 leading from the soaking drum that the oil will be digested in the soaking drum for a suitable length of time to secure an optimum cracking time for the oil. Discharge line 11 is provided with a pressure valve 12 and opens into a separator 15. The pressure upon the oil flowing into the separator is reduced and the major portion of the oil vaporizes and passes upwardly through the separator. Heavy residue, such as tar, accumulating in the separator is withdrawn through a discharge line 16 to a suitable place of disposal, not shown. Vapors are withdrawn from the upper portion of the separator through a line 17 and are passed successively through condensers 18 and 19. The vapors are withdrawn from condenser 19 through a line 20 and are delivered into an intermediate portion of the bubble tower 2. Bubble tower 2 contains a plurality of spaced plates and bell caps according to the usual construction. The vapors in passing through the bubble tower are fractionated and the uncondensed vapors, such as light naptha, are withdrawn through line 21 to a suitable place of disposal, not shown.

The fractions are collected at spaced intervals within the bubble tower and are separately withdrawn through lines 23 and 24 to accumulators 25 and 26 respectively and thence are passed through lines 27 and 28 to exchangers 18 and 19 respectively. The fractions are passed through pumps 29 and 30 respectively to independent heating coils 31 and 32 disposed in the furnace 6, or if desired disposed in separate furnaces. The furnace is heated by burners 33 and the coil 31 is disposed in the hottest portion of the furnace. The fractions are delivered from coils 31 and 32 through lines 34 and 35 respectively, to soaking drum 10. Line 34 opens into the portion of soaking drum 10 which is most remote from discharge line 11, whereas line 35 opens into the soaking drum intermediate line 34 and line 9.

The condensate formed in heat exchangers 18 and 19 is conducted by a line 36 to an accumulator 37. It is delivered from accumulator 37 through line 38 and pump 39 to a heating coil 40 disposed in the coolest portion of the furnace, and from the furnace is delivered through line 41 to a portion of the soaking drum 10 intermediate line 9 and the discharge line 11.

It will be clear from the foregoing description that in the preferred embodiment each fraction as well as the charging stock is independently subjected to that temperature and pressure at which the most efficient cracking will occur. The lighter fractions withdrawn from the upper portion of the bubble tower are subjected to the highest temperature. The heavier fractions collected in an intermediate portion of the bubble tower are subjected to a lower temperature. The fresh feed stock together with the residues of the bubble tower are subjected to a still lower temperature and the condensate obtained in heat exchangers 18 and 19 is subjected to still lower temperatures.

The heated fractions and charging stock after being subjected to cracking temperature in the heating coils are commingled in the soaking drum where they are digested under conditions of temperature and pressure to produce most efficient cracking reaction. The lighter fractions have a longer distance to travel through the soaking drum and hence are digested for a longer time. The successively heavier fractions and charging stock are digested for successively shorter periods of time. As one example of the process, the charging stock such as intermediate gas oil is subjected in the cracking coil and soaking drum to a temperature of 875° F., more or less, under a pressure of one hundred pounds per square inch, more or less. The temperature and pressure may be varied in order to obtain optimum cracking conditions for the particular charging stock. The lighter fractions, such as heavy naphtha and light gas oil, are subjected to higher temperatures such as 935° and 900° F., respectively. The heavier fractions such as heavy gas oil are subjected to a lesser temperature, such as 850° F., more or less. The more highly heated light naphtha remains in the soaking drum the relatively longer length of time necessary to secure the required cracking thereof. The light gas oil, intermediate gas oil and heavy gas oil are digested for successively shorter lengths of time whereby optimum cracking conditions are obtained for each oil.

It will be understood that a multiple circuit furnace can be used as shown or that a separate furnace can be used for each fraction. Two or more circuits and furnaces can be used as required depending upon the quality of the charging stock. It will be understood that the operating pressure upon the oil within the heating coils and soaking drums may be varied. A separate soaking drum can be used for each circuit or for two or more of the circuits as desired. The size of the soaking drums used can be varied and the pressures upon the oil can be varied within each drum. If soaking drums for each circuit are used of the same size greater pressures are used upon the lighter fractions. Alternatively two of the fractions can be introduced into the soaking drum at the same place and some of the advantages of the invention will be retained. While the outlet of the soaking drum has been illustrated as being at the bottom of the soaking drum, it will be understood that the outlet can be at the top and the inlets nearer the bottom of the soaking drum. If desired, two soaking drums and two sets of fractionating equipment with a multiple circuit furnace or separate furnaces operating at different pressures can be used and arranged so that the majority of the fractionation will occur in separate sets of equipment as an aid to segregation.

Various changes may be made within the scope of the appended claims in which it is desired to claim all novelty inherent in the invention as broadly as the prior art permits.

I claim:
1. The process of cracking hydrocarbon oil which comprises subjecting the charging oil to optimum temperature and pressure for cracking in an elongated narrow heating zone, digesting the heated oil in an enlarged digesting zone to produce efficient cracking, discharging the digested oil into a vapor separating zone and separating the same into liquid and vapor fractions, separating the vapor into a plurality of condensate fractions in a fractionating zone, subjecting the separated condensate fractions while isolated from each other and from the charging oil to optimum conditions of temperature under pressure in independent narrow heating zones, discharging the heated fractions into said enlarged digesting zone in such manner as to digest a lighter fraction for a longer time than a heavier fraction, and discharging the digested fractions into said separating zone.

2. A process of cracking hydrocarbon oil which comprises subjecting the charging oil in an elongated narrow heating zone to optimum temperature and pressure for cracking, passing the heated oil into an enlarged digesting zone, digesting the heated oil therein to produce efficient cracking, discharging the digested oil into a separating zone and therein separating it into vapor and liquid, separating the vapor into a plurality of condensate fractions in a fractionating zone, subjecting the separated condensate fractions while isolated from each other and from the charging oil to independent conditions of temperature under pressure regulated to produce the most efficient cracking reaction of said separate fractions, digesting the heated fractions in an enlarged digesting zone for progressively longer lengths of time in the order of their decreasing specific gravity under superatmospheric pressure to produce efficient cracking, then discharging the digested fractions into said separating zone.

FRANK H. EDSON.